United States Patent [19]

Bobeck

[11] 3,811,120

[45] May 14, 1974

[54] MAGNETIC DOMAIN PROPAGATION ARRANGEMENT HAVING CHANNELS DEFINED BY STRAIGHT LINE BOUNDARIES

[75] Inventor: Andrew Henry Bobeck, Chatham, N.J.

[73] Assignee: Bell Telephone Laboratories, Incorporated, Murray Hill, N.J.

[22] Filed: Apr. 5, 1973

[21] Appl. No.: 348,282

[52] U.S. Cl. .................... 340/174 TF, 340/174 SR, 340/174 VA

[51] Int. Cl. ..................... G11c 11/14, G11c 19/00

[58] Field of Search .. 340/174 TF, 174 SR, 274 VA

[56] References Cited

UNITED STATES PATENTS

| | | | |
|---|---|---|---|
| 3,644,908 | 2/1972 | Bobeck | 340/174 TF |
| 3,636,531 | 1/1972 | Copeland | 340/174 TF |
| 3,676,872 | 7/1972 | Lock | 340/174 TF |

*Primary Examiner*—Stanley M. Urynowicz, Jr.
*Attorney, Agent, or Firm*—H. M. Shapiro

[57] ABSTRACT

Magnetic single wall domains are moved along a channel defined by a straight line boundary in response to a magnetic field rotating in the plane of domain movement.

14 Claims, 13 Drawing Figures

MAGNETIC DOMAIN PROPAGATION ARRANGEMENT HAVING CHANNELS DEFINED BY STRAIGHT LINE BOUNDARIES

FIELD OF THE INVENTION

This invention relates to magnetic memory arrangements and, more particularly, to such memories in which information can be represented in the form of magnetic domains which are movable.

BACKGROUND OF THE INVENTION

Movable magnetic domains are well known in the art. A particularly attractive arrangement employing such domains includes a layer of material characterized by uniaxial anisotropy along an axis normal to the plane of the layer. A domain in such a layer has its magnetization aligned in a first direction along that axis and the remainder of the layer has its magnetization in a second direction along that axis. A domain in this type of arrangement appears as a circular disk when viewed under polarized light and is thought of as a right circular cylinder extending between the opposite faces of the layer.

If the diameter of the cylinder is maintained by a magnetic bias field antiparallel to the magnetization of the domain, the domain is referred to as a magnetic bubble. If the bias field is reduced, the bubble elongates into a strip domain. But in the usual operation, the bias field is held constant to maintain the bubble at some nominal operating diameter.

A magnetic bubble is moved by generating localized magnetic gradients to which the bubble responds. If electric conductors are employed to produce those field gradients, those conductors are formed as a sequence of interconnected loop geometries and are pulsed sequentially to produce consecutively offset fields which modify the bias field. The result is consecutively offset field gradients operative to move the domain along a path defined by the conductor pattern.

In order to take fuller advantage of the potential for high packing densities offered by the bubble technology, it has been found helpful to simplify the geometry of the conductors. For, inasmuch as nonlinear conductor geometries are required, available photolithography capabilities rather than bubble sizes define the limits of packing densities. A straight line conductor geometry, of course, allows the highest packing densities. But, hitherto, it has not been possible to move bubbles along a straight line conductor without some auxiliary structuring. For example, bipolar pulses applied to a conductor merely shuttle a bubble back and forth across the conductor coupled to the layer in which bubbles can be moved. Some latching arrangement has been necessary to offset a domain along the conductor.

BRIEF DESCRIPTION OF THE INVENTION

A mechanism has been found for moving any one of a variety of magnetic domains, including bubbles, along a boundary defined by an electrical conductor, an ion implanted region, a groove, a hillock, or a linear magnetically soft element. The mechanism involves a proper choice of material properties, as well as the proper choice of thickness for a layer of the material to permit the establishment of a cyclically varying domain wall structure including periodic energy minima along the wall. The variations are produced in response to a cyclically varying magnetic field conveniently a field reorienting in the plane of the layer. In the absence of a boundary, the wall variations are reversible for each cycle of the field resulting in no net movement of the structure along the boundary. The presence of a boundary coupled to the wall modifies the reversibility or symmetry of the variations during a portion of the cycle resulting in net displacement.

In a most easily understood embodiment, strip domains are advanced between parallel grooves in a magnetic layer. Information is represented in terms of a bubble and strip domain pattern in the same layer as in terms of bubble domains in an adjacent layer.

*The IEEE Transactions on Magnetics*, September, 1972, Vol. MAG-8, No. 3 at page 294 et seq in an article entitled "New Types of Domain Structure in Orthoferrite" most recently describes the effect of the movement of domain groups along, for example, cracks in materials. The present invention is considered a departure from such prior art thinking in that laboratory curiosities of this type are herein adapted to more practical ends by using a domain structure as a transport mechanism for information.

DETAILED DESCRIPTION

Figure 1:
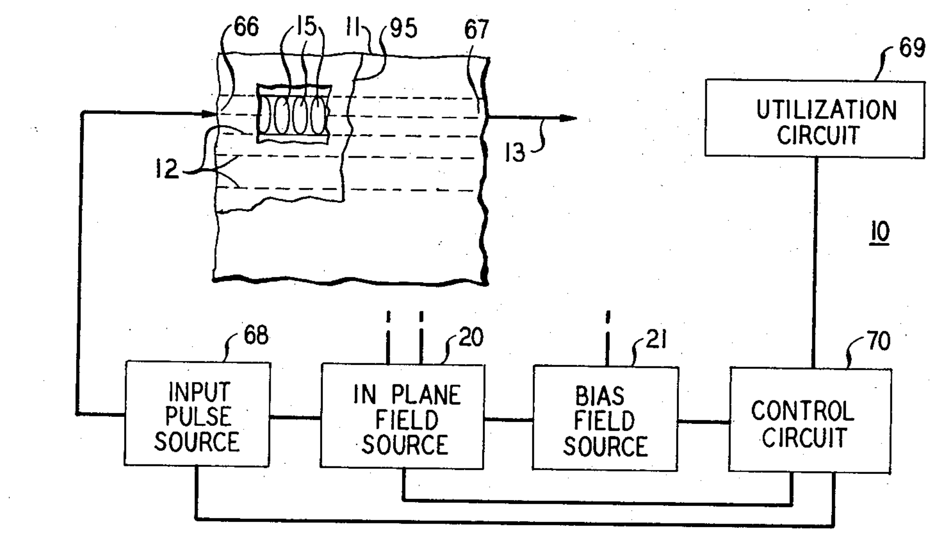
FIG. 1 is a schematic representation of a memory arrangement in accordance with this invention.

FIG. 1 shows a magnetic memory arrangement 10 in accordance with this invention. The arrangement comprises a layer 11 of material in which magnetic domains (or domain walls) can be moved. Elongated magnetic elements 12, in pairs, define therebetween channels 13 in layer 11 for the movement of domains 15 therealong.

Figure 2:
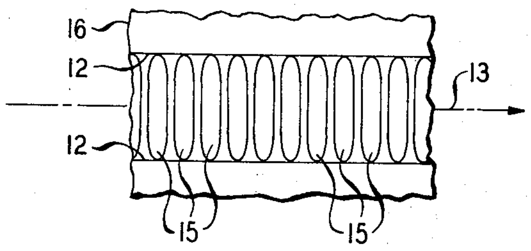
FIGS. 2 through 13 are schematic representations of portions of the arrangement of FIG. 1 showing magnetic conditions therein during operation.

A portion 16 of a representative channel 13 is shown enlarged in FIG. 2. Elements 12 which define channel 13, are characterized by straight line, geometries defined and formed typically via photolithographic techniques. In one embodiment, the elements comprise grooves in layer 11. As such, the elements constitute significant magnetic discontinuities in layer 11 along which domains 15 move in response to a magnetic field rotating in the plane of layer 11. The in-plane field is supplied by a familiar source represented in FIG. 1 by block 20.

The domains 15 may be seen to extend from one groove 12 to the other in FIG. 2. The actual geometry of the domain is determined by a bias field antiparallel to the domain. We will return to the shape of the domain and the bias field hereinafter. Suffice it to say at this juncture that a bias field is present, when needed, and is supplied by a familiar means represented by block 21 in FIG. 1.

Domains 15 are observed to move to the right, as viewed in FIG. 2, in response to a magnetic field rotating, in either direction, in the plane of layer 11. The observed motion of a representative domain in response to the in-plane field is represented in the sequence of FIGS. 3 through 6. Consider a representative domain 15 of FIG. 3 to be in an initial position aligned with an imaginary reference position represented by broken line 30. Domain 15 thus appears as an oval symmetrically disposed about line 30. We will assume that the in-plane field is directed upward, at this instant, as indicated by the arrow $H_r$ in FIG. 3.

Figure 4:
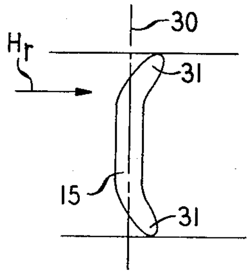
Figure 5:
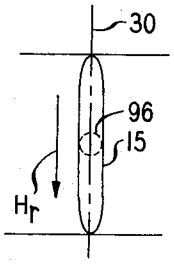

FIG. 4 shows the in-plane field, $H_r$, directed to the right. In response, domain 15 enlarges to the right at edge regions 31 moving the center of the domain to the right. When the field next reorients to a downward position as shown in FIG. 5, the domain returns to an oval shape at a position displaced to the right as viewed in FIG. 5.

Figure 6:
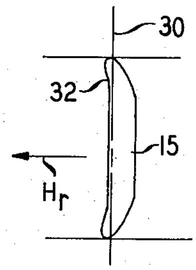

An apparant partial displacement backwards occurs when the in-plane field next reorients to the left as shown in FIG. 6. The regions 32 shown there can be seen to extend leftward, as viewed, shifting the center of mass of domain 15 to the left. This reverse displacement is less pronounced than the forward displacement which occurs during the earlier portion of the cycle and a net displacement to the right thus results for each cycle of the in-plane field.

It may be noted that the movement mechanism appears operative near the ends of the domain. Experimentation supports such an observation. The domains move faster the closer the boundaries 12 are to one another. In the limit, when an increased bias field reduces (strip) domain 15 to a magnetic bubble, the bubble can be made to move along a single boundary by the mechanism described.

Figure 7:
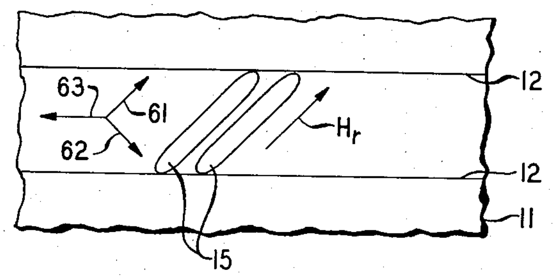
Figure 8:
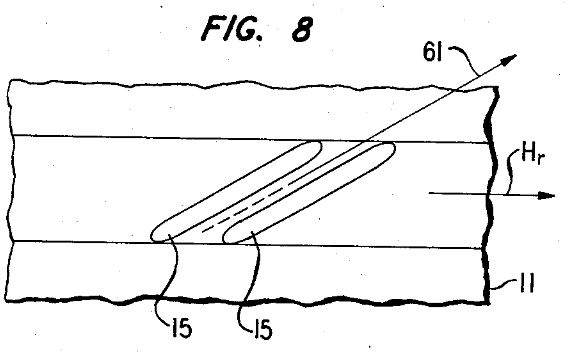

On the other hand, there appears to be an additional mechanism for domain movement at work over the bulk of the domain. The additional mechanism can be understood from a consideration of FIGS. 7 through 12. The explanation is for a layer 11 comprising a hexagonal single crystal film with (out of plane) easy ([111]) axes indicated by arrows 61, 62, and 63 in FIG. 7 as is familiar in the art. Consider the in-plane field H in an orientation aligned with an easy axis indicated by arrow 61. Domains 15 strip out along this axis to boundaries 12. When the field next orients to the right as indicated by arrow $H_r$ in FIG. 8, domains 15 remain essentially aligned with the easy axis (61).

Figure 9:
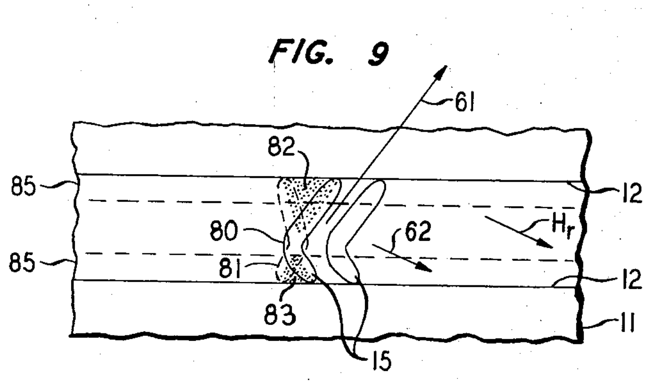

When the in-plane field H next reorients to the direction of easy axis 62 as shown in FIG. 9, domains 15 buckle so that different portions thereof follow axis 61 and axis 62 resulting in a shift to the right as viewed of the center of mass of each domain.

Figure 10:
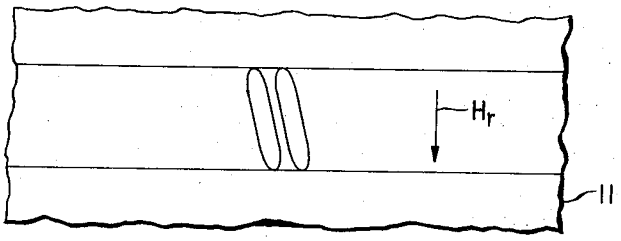
Figure 11:
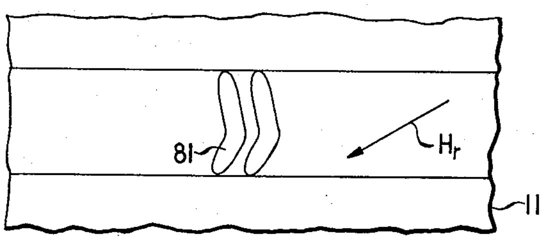
Figure 12:
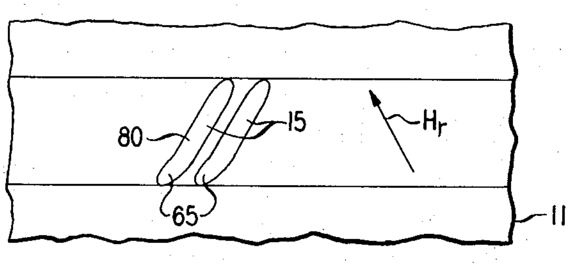

The buckling becomes less pronounced when the in-plane field next reorients downward as indicated by arrow H in FIG. 10. The domains, approach their original shape shown in FIG. 7 when the field first reorients downward and to the left as shown by the arrow H in FIG. 11 and then reorients upward and to the left as shown by arrow H in FIG. 12. Specifically, when the field next reorients upward and to the left as shown by arrow H in FIG. 12, the domains 15 buckle slightly in a direction opposite to that shown in FIG. 9. The extent of the buckling is less than that of FIG. 9 because the magnetostatic repelling force between adjacent (strip) domains inhibits the lower portions 65 of these (strip) domains from rotating further clockwise.

This difference in the extent of buckling during different portions of the cycle of the in-plane field is a cause of the net displacement of a domain to the right as viewed and is attributed to the crystalline properties of the film. The effect is due, in part, to the out-of-plane inclination of the easy axes of a hexagonal ([111]) crystal. This mechanism, as has been stated hereinbefore, is effective over the bulk of the domain and can be seen to be consistent with and operative to augment the effect of the mechanism operative at the ends of the domains.

Figure 3:
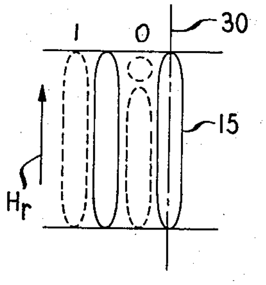

The sequence of mutually repelling domains, each with a flagellum, comprises a domain wall structure which becomes a locomotion mechanism for domains, such as bubbles coupled to it. A variety of information-representing arrangements for movement by this structure is available. FIG. 3, for example, shows an arrangement where, in a single layer 11, information is represented in alternate bit positions. The example shown represents a binary one as a strip domain and represents a binary zero as a foreshortened strip domain and a bubble as indicated at the top of the figure. Alternatively, different numbers of bubbles can be used, in a similar manner, to represent information. The information is conveniently applied to the inputs of a "fine-grained" interactor described in U.S. Pat. No. 3,723,716 of A. H. Bobeck and H. E. D. Scovil, issued Mar. 27, 1973 prior to detection.

An alternative arrangement includes an additional layer 95 of FIG. 1 in which magnetic bubbles are generated in a manner to couple an associated domain 15 much as illustrated by bubble 96 of FIG. 5. Of course, more than one bubble can be employed in each position leading to higher level logic possibilities. Exchange or magnetostatic coupling between the domains of the two films is possible. Suitably coupled layers are disclosed in copending application, Ser. No. 327,625 filed Jan. 29, 1973 for A. H. Bobeck and H. E. D. Scovil.

Thus, a pattern of domains maintains its integrity, when moved as described, representing information in a reliable way. Such a pattern is formed and detected at opposite ends of channel 13 of FIG. 1 in positions designated 66 and 67 respectively. An input pulse source for introducing domains at 66 is represented by block 68 in FIG. 1 and a utilization circuit is represented by block 69.

The sources 20, 21, and 68 and circuit 69 are under the control of a control circuit 70. The various sources and circuits may be any such elements capable of operating in accordance with this invention.

The foregoing illustrative embodiment and variations were described in terms of grooves in a domain layer because suitable grooved material is easy to obtain by well-controlled ion milling techniques and because it is relatively easy to understand the role the grooves play in the domain movement operation. That role is now explained as a basis for an understanding of possible alternatives.

Figure 13:
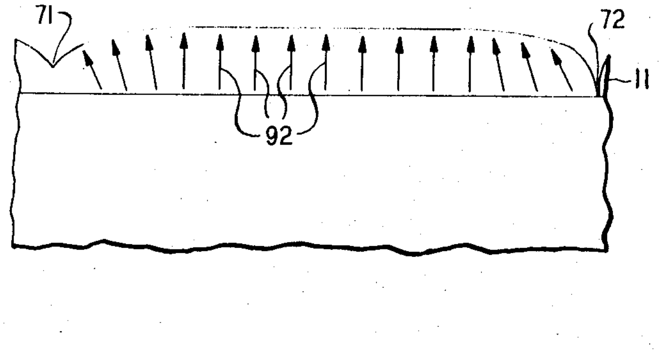

FIG. 13 shows a portion of epitaxial layer 11 of FIG. 1 with grooves 71 and 72 therein. The grooves introduce stress which reduces the uniaxial anisotropy in layer 11 over a controllable distance in from the grooves. The existence of the boundaries thus reduces the anisotropy in a manner to allow the edge effect (see FIGS. 3–6) to occur and the separation between the boundaries and the extent to which the reduction in the anisotropy occurs determines the coupling to the domain. Further, the separation between the domains of the domain wall structure (15 of FIG. 2) determines the resistance of the domains 15 to realignment as discussed in connection with FIGS. 7 through 12.

The lower the uniaxial anisotropy (Q) provided by the boundaries, the greater the stripout action produced by the in-plane field, much as we see in low Q materials. Because of the greater areas swept out by the "arms" of the domains, there is greater domain movement. This is depicted in FIG. 9 where domain 80 of FIG. 9 is shown superimposed on domain 81 of FIG. 11 thereby defining the swept-out areas 82 (and similarly 83). The low anisotropy regions, designated 85 in FIG. 9 extend inward from boundaries 12 the anisotropy increasing with distance, into the channel, from each boundary.

Of course, a variety of geometry-controlling means for defining a magnetically significant boundary operative in this manner exists. Ion implantation apparatus exists for defining an ion implanted region, in contradistinction to an ion milled groove for example, which is also operative in this manner. In addition, familiar photolithographic techniques exist for defining a mesa or a magnetically soft element on the surface of layer 11. Such elements can be made to function in this manner. Further, photolithographic techniques may be utilized to form an electrical conductor to which a current is impressed or to form an exchange-coupled pattern of magnetically retentive material either of which is also suitable. The boundaries in each instance are of prescribed (viz: straight line) geometry and are operative to produce unidirectional movement as described.

It is clear from the figures that the movement mechanisms are necessarily not symmetrical in operation. Nor is the effect reversible merely by reversing the direction of rotation of the in-plane field (viz: the domains do not move in the reverse direction). The reason for the asymmetry and thus directionality is felt to lie with the crystal structure of layer 11. Layer 11 comprises typically a cubic crystal with the grooves aligned along the ([111]) axis, the body diagonals. But three body diagonals exist which means that several of the easy axes 61, 62, and 63 of FIG. 7 exist in layer 11. Directionality is thought to be a result of the tendency of the magnetization to align with those easy axes during operation, as explained above. Whatever the mechanism, however, unidirectional movement has been observed as has the domain distortion of FIGS. 2 through 6.

In the absence of an advantageous crystal structure to cause unidirectional domain movements, other arrangements may be used to this end. For example, a pair of boundaries may be defined by two grooves of different depths. This is indicated in FIG. 13 by grooves 70 and 72. The reduction in anisotropy is indicated by arrows 92 which are shown canted and shortened at the edges of the channel at the grooves. With grooves of different depths unidirectional turns and thus closed loop channels can be formed.

In a test arrangement in accordance with this invention a layer of SmFeGarnet, 8.3 microns thick was grown via liquid phase epitaxial techniques on a substrate of $Gd_3Ga_5O_{12}$. The layer had a $Q = H_k/4\pi Ms =$ 1.3 where $H_k$ is the uniaxial anisotropy and $4\pi Ms$ is the magnetization of layer 11. The layer exhibited magnetic bubbles with diameters of 2.9 $\mu$m at a bias field of 330 oersteds and strip domains as shown in FIG. 2 at a bias field of 180 oersteds. Boundaries 12 were grooves with a V-shaped cross-sectional geometry and a variety of separations, specifically 68, 104 and 128 microns between several test pairs of grooves. Domain (15) movement at a rate of 1.0, 0.5, and 0.15 cm/sec was achieved in response to an in-plane field of 18 oersteds rotating at 100 kilohertz.

In general, layer 11 of FIG. 1 has a low Q, a magnetization $4\pi Ms$ of about 200 Gauss, a wall energy of about 0.5 ergs cm$^2$, a strip width of 8 microns and a thickness of 10 microns. The layer 95 of FIG. 1, in general, has a $4\pi Ms$ of about 200, a wall energy of about 0.1 ergs cm$^2$, a strip width of about 3 microns and a thickness of about 3 microns. Layer 11 is considered a "thick" film in the parlance of the bubble technology.

What has been described is considered merely illustrative of the principles of this invention. Therefore, various modifications thereof can be devised by those skilled in the art in accordance with those principles within the spirit and scope of this invention as encompassed by the following claims.

What is claimed is:

1. Magnetic apparatus comprising a substantially uniform layer of material in which magnetic domains can be moved, means for defining in said layer a magnetically significant boundary along a path including first and second positions, means for defining along said path a domain wall structure which varies in response to a magnetic field cyclically varying in the plane of said layer, said structure being coupled to said boundary in a manner to render said variations irreversible thus effecting movement of said wall structure along said path, wherein said boundary is defined by a magnetic element having a straight line geometry.

2. Magnetic apparatus in accordance with claim 1 wherein said layer is characterized by uniaxial anisotropy normal to the plane of said layer, and said boundary is defined by an element operative to reduce the anisotropy of said layer along an edge portion of said path at said boundary.

3. Magnetic apparatus in accordance with claim 2 wherein said layer is a hexagonal crystal.

4. Magnetic apparatus in accordance with claim 2 wherein said path is defined by a pair of such elements.

5. Magnetic apparatus in accordance with claim 2 wherein said boundary is defined by a groove in said layer.

6. Magnetic apparatus in accordance with claim 4 wherein said elements are defined by grooves of different depths.

7. Magnetic apparatus in accordance with claim 1 also including means for selectively introducing domains at said first position and means for detecting the presence of a domain at said second position.

8. Magnetic apparatus in accordance with claim 1 wherein said wall structure comprises a sequence of single wall magnetic domains.

9. Magnetic apparatus comprising a first layer of material in which magnetic domain wall structures can be moved, said layer being characterized by a first uniaxial anisotropy normal to the plane of said layer, means for defining along an axis in said layer an elongated straight line boundary, said first layer being characterized by variations in said anisotropy with distance from said axis, said layer having properties such that said structures coupled to said boundary vary irreversibly in response to a substantially uniform cyclically reorienting drive field.

10. Magnetic apparatus in accordance with claim 9 also including means for modifying said domain structures in a manner to represent information.

11. Magnetic apparatus in accordance with claim 10 wherein such last-mentioned means includes a second layer capable of having magnetic domains moved therein, said first and second layers having properties and being so disposed such that said magnetic domains are coupled to said domain structures.

12. Magnetic apparatus in accordance with claim 11 including means for selectively generating domains at a first position in said second layer and means for selectively detecting the presence of a domain at a second position in said second layer displaced in said path from said first position.

13. Magnetic apparatus in accordance with claim 12 wherein said axis is defined by a pair of boundaries at which the anisotropy is relatively low and between which the anisotropy increases to said first anisotropy.

14. Magnetic apparatus in accordance with claim 13 including means for providing a magnetic field at consecutive angular orientations in the plane of said first layer for supplying said drive field.

* * * * *